(12) United States Patent
Rondolino

(10) Patent No.: US 8,597,711 B2
(45) Date of Patent: Dec. 3, 2013

(54) METHOD FOR ENRICHING RICE AND PRODUCT OBTAINED THEREBY

(75) Inventor: Piero Rondolino, Livorno Ferraris (IT)

(73) Assignee: Rondolino Societa' Cooperativa Agricola, Livorno Ferraris (IT)

( * ) Notice: Subject to any disclaimer, the term of this patent is extended or adjusted under 35 U.S.C. 154(b) by 0 days.

(21) Appl. No.: 12/742,633

(22) PCT Filed: Nov. 13, 2007

(86) PCT No.: PCT/IT2007/000798
§ 371 (c)(1),
(2), (4) Date: Sep. 13, 2010

(87) PCT Pub. No.: WO2009/063511
PCT Pub. Date: May 22, 2009

(65) Prior Publication Data
US 2010/0330254 A1 Dec. 30, 2010

(51) Int. Cl.
*A23L 1/182* (2006.01)
*A23L 1/00* (2006.01)

(52) U.S. Cl.
USPC .......................................... 426/627; 426/618

(58) Field of Classification Search
None
See application file for complete search history.

(56) References Cited

U.S. PATENT DOCUMENTS 4,767,636 A * 8/1988 Ramos et al. ................. 426/291
4,961,943 A * 10/1990 Blanthorn et al. ............ 426/102

FOREIGN PATENT DOCUMENTS

| JP | 60-43351 A | | 3/1985 |
| JP | 60043351 A | * | 3/1985 |
| JP | 2001-78687 A | | 3/2001 |
| JP | 3944336 B2 | * | 7/2007 |
| KR | 2002-0081577 A | | 10/2002 |
| KR | 2002081577 A | * | 10/2002 |

* cited by examiner

*Primary Examiner* — Humera Sheikh
*Assistant Examiner* — Subbalakshmi Prakash
(74) *Attorney, Agent, or Firm* — Paul & Paul

(57) ABSTRACT

A method for enriching rice, comprising the steps of: providing an amount of rice grains; providing an amount of vegetable germs, for instance germs of rice, wheat and/or maize; mixing said rice grains and said germs so as to make at least part of said germs adhere to and/or become at least partially incorporated into said rice grains. The invention also concerns a rice mixture enriched with vegetable germs, at least part of said germs being at least partially incorporated into the rice grains.

12 Claims, 4 Drawing Sheets

METHOD FOR ENRICHING RICE AND PRODUCT OBTAINED THEREBY

The invention relates to a method for enriching rice and to the product obtained thereby.

More precisely, the invention relates to a method for enriching rice grains with vegetable germs, such as germs of rice, wheat, grain or other vegetables, in particular of the family Gramineae.

The method according to the invention is mainly intended for enriching rice for use as human food, but it can be used also for producing rice for animal feed or for other purposes.

The method according to the invention is mainly aimed at producing rice intended for direct eating by human beings or other animals, but the rice obtained by the method could also be used as a transformation product in food industry, for producing complex foods or beverages.

As known, rice is one of the cereals most used as food, in particular as human food.

As known, rough rice as obtained from harvest is not eatable as such and is to be subjected to special processing that is performed in suitable processing factories or mills.

In almost all industrialised countries, very complex processing cycles are used for producing rice for use as food, and several by-products and end products result from such cycles.

Tailings, employed for instance as bedding for animals, chaff, employed for instance as livestock feed, and germ, employed for instance for oil production, are some of the main by-products. End products include for instance refined or white rice and brown rice.

Referring to FIGS. 1 and 2, a typical prior art processing cycle for rough rice can include some or all of the following steps:

- drying (111), generally obtained by means of streams of hot air in storage towers;
- cleaning (113), consisting in removal of impurities and aiming at eliminating from rough rice dust and foreign bodies accumulated during harvest and in the previous processing steps; in such step, metal bodies are for instance removed by means of magnets;
- husking (115), consisting in removal of the husks of rough rice, which is subsequently called "husked" rice or brown rice;
- whitening (117), generally obtained through abrasive machines aimed at eliminating aleurone AL, the thin film still coating husked rice, from husked rice itself;
- buffing (119), obtained by adding Vaseline or linseed oil and aimed at smoothing the rice grain thereby giving the so called "camolino" rice;
- polishing (121), obtained by mixing rice with talc and glucose and aimed at producing the so-called polished rice, which has a glossier appearance and can be better preserved;
- packing (123), which is performed for instance in vacuum, in modified atmosphere or in controlled atmosphere or in neutral atmosphere, as the case may be.

Husking aims at removing the so called "glumes" GL, that is the non-eatable coat covering the grain of rough rice as harvested and forming about 20% in weight of grain GR of rough rice.

The coat encloses the caryopsis, consisting of aleurone or chaff in the darker external portion, and of endosperm ES or starch and germ GM, essential for perpetuating the species, in its internal portion. The germ is housed in a small sac SP, the spermoderm, which, after germ extraction, will form the so called tooth of the rice grain.

The germ amounts to about 2% in weight of the rough rice grain and contains a lot of nutritive substances, in particular proteins with all amino acids, lipids, phytine, minerals such as phosphorus, potassium, calcium and magnesium, and vitamins.

During the processing cycle to which the rice grain is subjected, and typically during the whitening step (117), the very tender germ is separated from the rice grain together with chaff In the latter case, the rice working process can therefore include a separation step (125), in which a suitable separating machine, of either centrifugal or sievelike type, separates chaff from germs. Germs can be used for instance for producing rice germ oil, whereas chaff can be used e.g. for livestock feed.

The centrifugal separator produces the pure germ, i.e. germ substantially without chaff traces.

As known, the processing cycle to which rice is conventionally subjected, deprives the grain of many nutritive substances, and substantially reduces it to a mere mass of starch (a starch content of about 90% in weight), which is nothing but a complex sugar. Actually, the total protein content of processed rice is generally in the range 7% to 9%, whereas pure germ alone has a protein content of about 30%.

Other less sophisticated working processes allow obtaining a so-called brown rice that, unlike refined rice, maintains several nutritive parts and substances and can be used as food.

Yet, such kind of rice is not always appreciated, because of its aesthetical appearance, its colour, its long cooking time (about seven times longer than white rice), and it is not suitable for all gastronomic uses, above all because it is unable to sufficiently absorb seasonings.

Thus, it is a first object of the present invention to provide a method of enriching rice, in particular rice having undergone a refining process, with further nutritive substances, without substantially affecting its aesthetical and cooking characteristics.

Since many of the most precious nutritive substances of interest for human nutrition are contained in the grain germ, which is removed during the conventional processing cycle, it is another object of the invention to provide a method of enriching rice by means of germs of the rice itself or of other vegetables, in particular of the family Gramineae.

It is a further object of the invention to provide a method of enriching rice, which method is easy and cheap to implement.

The above and other objects are achieved by the method according to the invention as claimed in the appended claims.

Advantageously, according to the invention, the germ is mixed with rice grains thereby making germ to adhere to and/or to be at least partially incorporated into the rice grain. At the end of the process according to the invention, therefore, rice grain and germ substantially form an integral body.

This result provides a considerable advantage from the viewpoint of the use as food, since rice is enriched with all precious nutritive substances contained in the genu in such a manner that such substances cannot become subsequently dispersed during the usual packing operations and during usual gastronomic use, in particular when boiling rice grains.

The germ separated from the grain, being very tender, would tend to dissolve during cooking, in particular during rice boiling, and to become wholly lost during draining, thereby undoing the benefits of its presence from the nutritional standpoint.

Advantageously, still in accordance with the invention, the step of mixing rice grains with germs is preferably performed immediately before the packing step, downstream the whole of the rice processing steps.

Actually, should the step of mixing rice grains with germs be performed before the end of the processing cycle, the machines performing the end finishing, due to the shaking and abrasive action, would cause again separation of part of the germs from the grains, in particular of that part that did not penetrate into the grain.

Advantageously, according to the invention, the rice grains can be associated with germs of rice, wheat, maize or other vegetables, in particular of the family Gramineae, or with a mixture of such germs, by using the same method.

Advantageously, the steps of the method according to the invention can be easily and cheaply incorporated into a conventional rice processing method.

A preferred embodiment of the method according to the invention is disclosed by way of non limiting example with reference to the accompanying drawings, in which.

Figure 3:
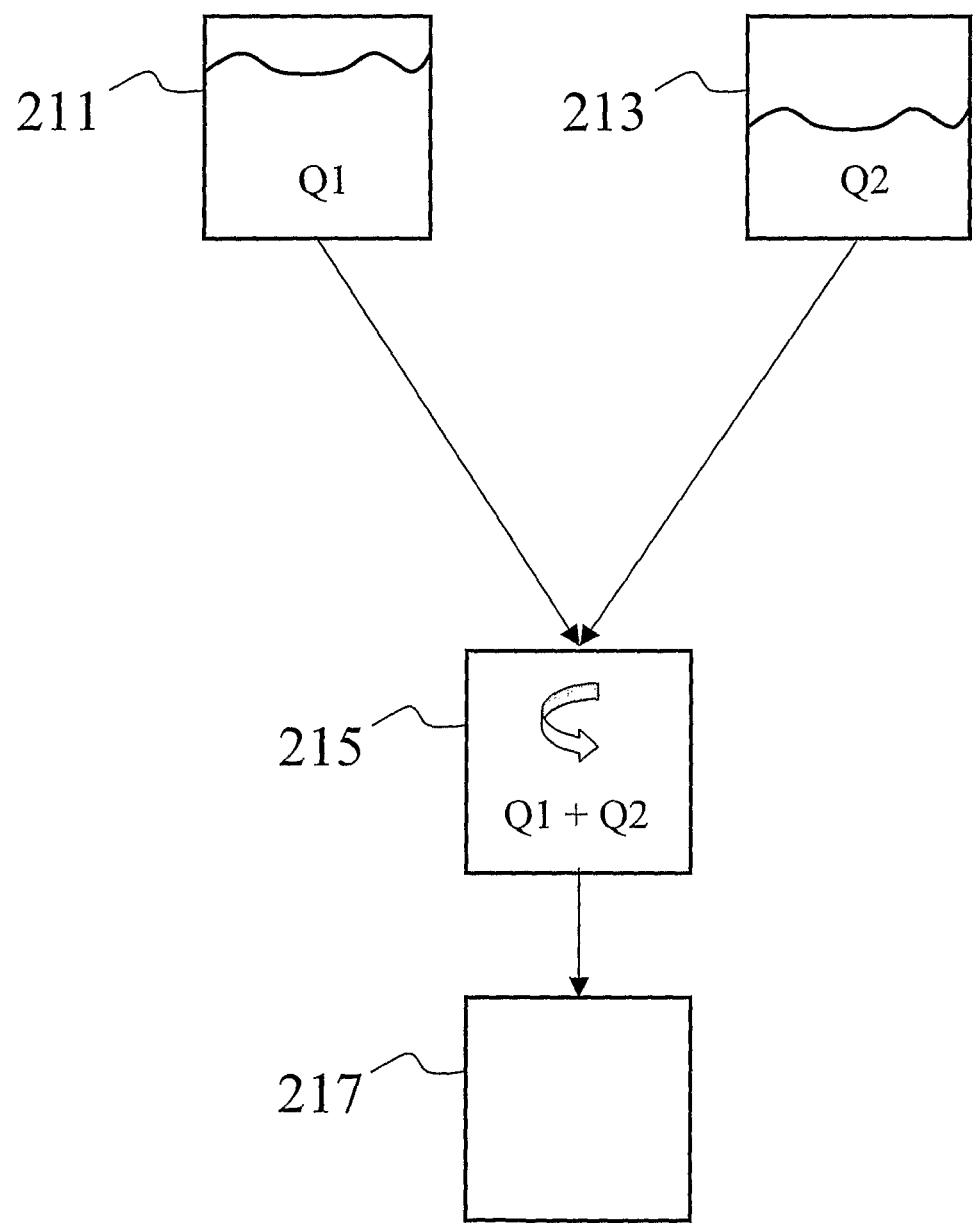
FIG. 3 is a block diagram of the steps of the method according to the invention.

Referring to FIG. 3, the method according to the invention comprises a step 211 in which an amount Q1 of rice grains is provided, a step 213 in which an amount Q2 of vegetable germs is provided, and a step 215 in which rice grains Q1 and germs Q2 are mixed together so as to cause at least part of said germs to adhere to and/or to be at least partially incorporated into said rice grains.

Figure 1:
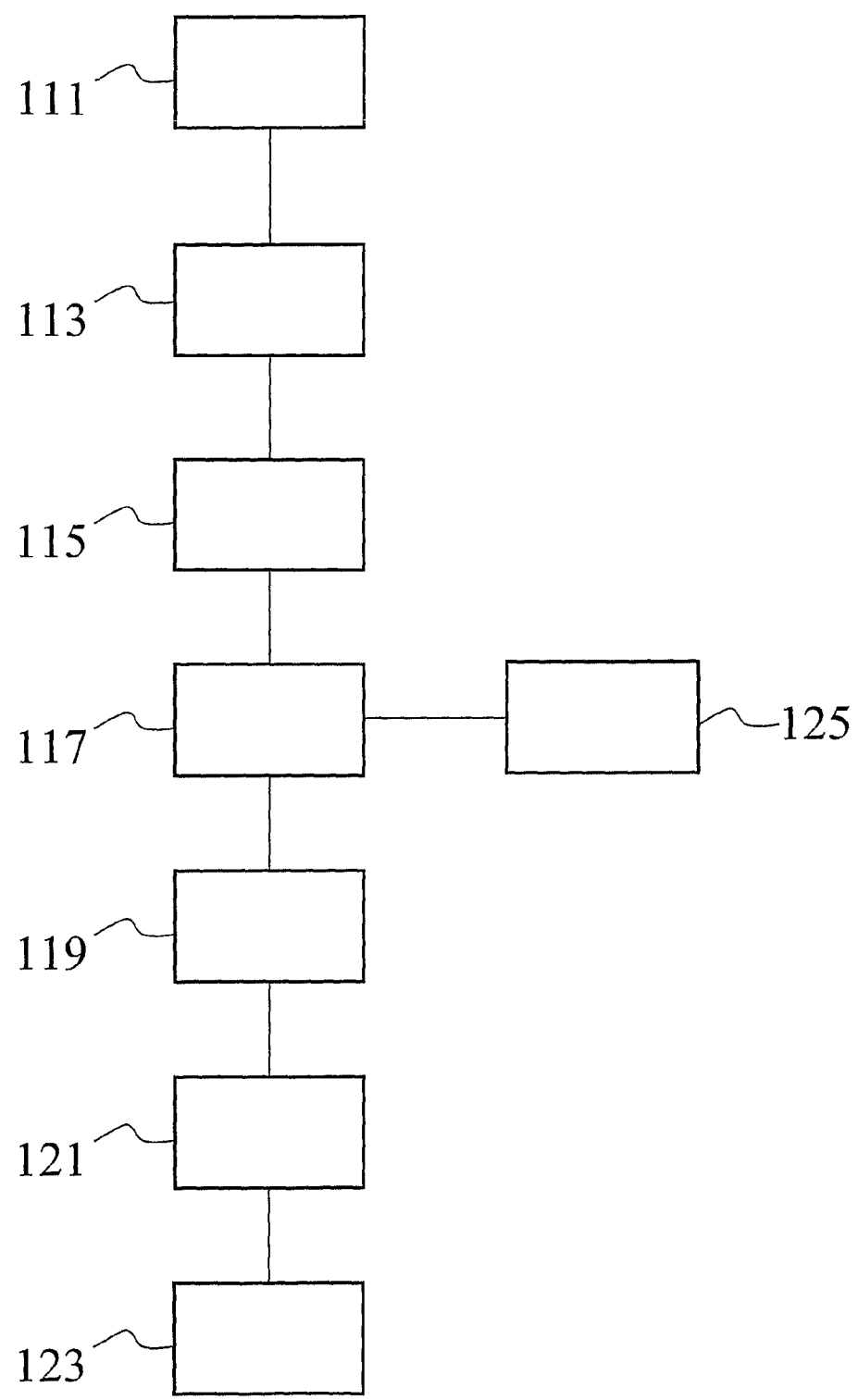
FIG. 1 is a block diagram of the main steps of a conventional rice processing method.
Figure 2:
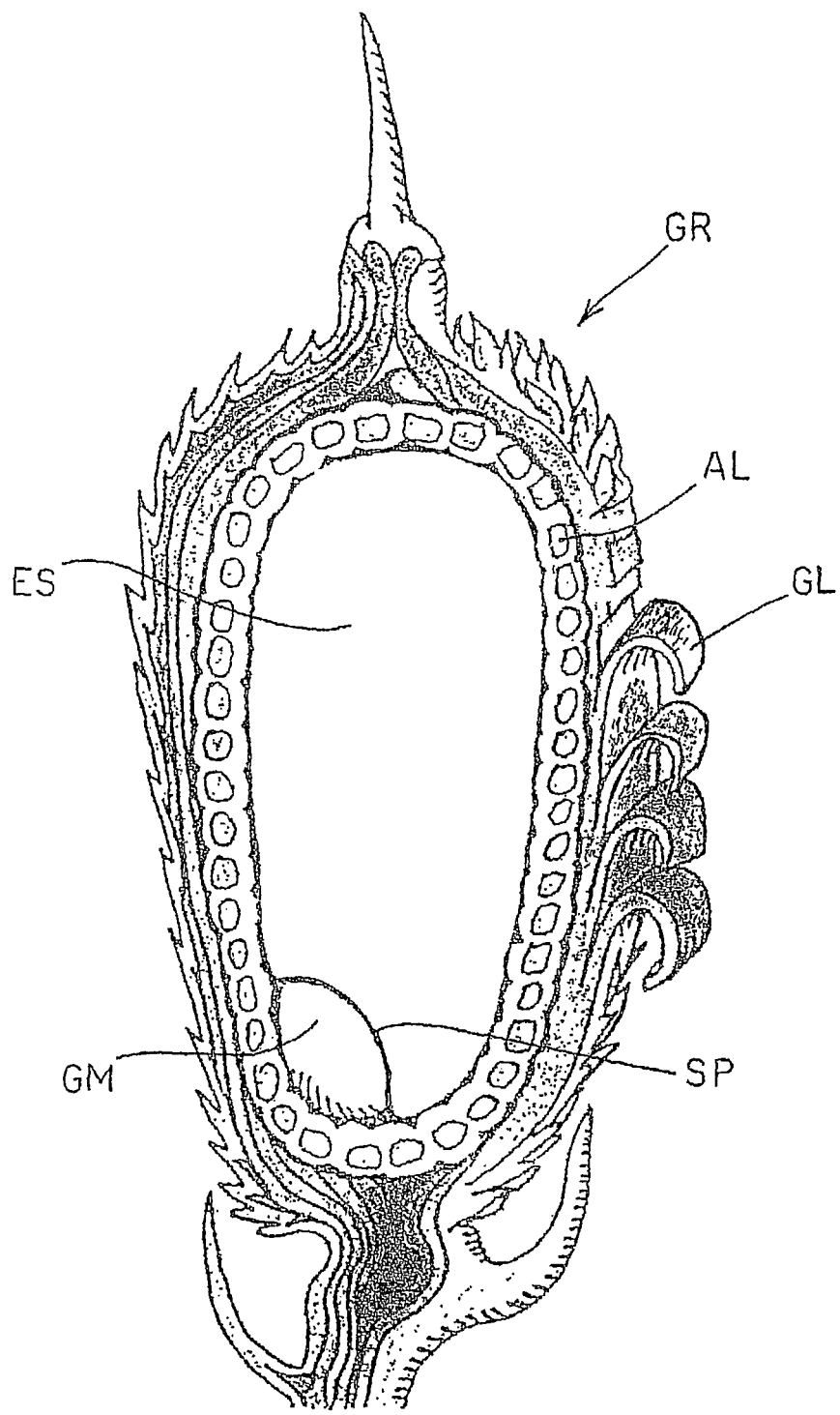
FIG. 2 is a schematic cross sectional view of a grain of rough rice.

According to the invention, said mixing step is advantageously performed immediately before the packing step, in a rice processing method of the kind outlined in FIG. 1.

Still in accordance with the invention, said amount Q1 of rice grains comprises rice grains that are at least in part without germ, i.e. grains obtained by the usual refining process.

According to the invention, said germs are for instance rice germs, preferably pure germs, i.e. substantially without chaff.

Further in accordance with the invention, germ amount Q2 preferably is in the range 2% to 3% in weight of the mixture.

Always in accordance with the invention, step 215 is followed, substantially without any interruption, by a packing step 217, which will be preferably performed in vacuum, or in modified atmosphere or in controlled atmosphere, in order to avoid deterioration of the product into which germ has penetrated.

Advantageously, according to the invention, by performing the step of germ adhesion to and/or inclusion into the rice grains immediately before the packing step, the risk of separation of the genus from the grains because of abrasion or shaking due to further treatments the grains are subjected to, is substantially avoided.

According to the invention, the step of germ adhesion to and/or inclusion into rice grains is performed by means of a mixer, e.g. an upright mixer, comprising a container, generally made of metal, internally equipped with an endless helical screw. Similar machines, known as finishing screws, are employed in the rice working process for different aims and in different way, for instance for polishing.

During mixing, the germ, which is very tender, as known, dissolves and at least part thereof penetrates into the rice grain, whereas the remaining part adheres to the outer grain wall.

In a preferred embodiment of the method according to the invention, mixing takes place for a time of 7 to 14 minutes, preferably for about 10 minutes, with a resulting increase in the temperature of the mixture up to about 30 to 40° C., preferably to about 35° C.

That temperature is optimum for obtaining germ adhesion to and/or inclusion into the grain and at the same time prevents the nutritional values of the product from being modified: in particular, it does not change the properties and content of starch and vitamins.

Figure 4:
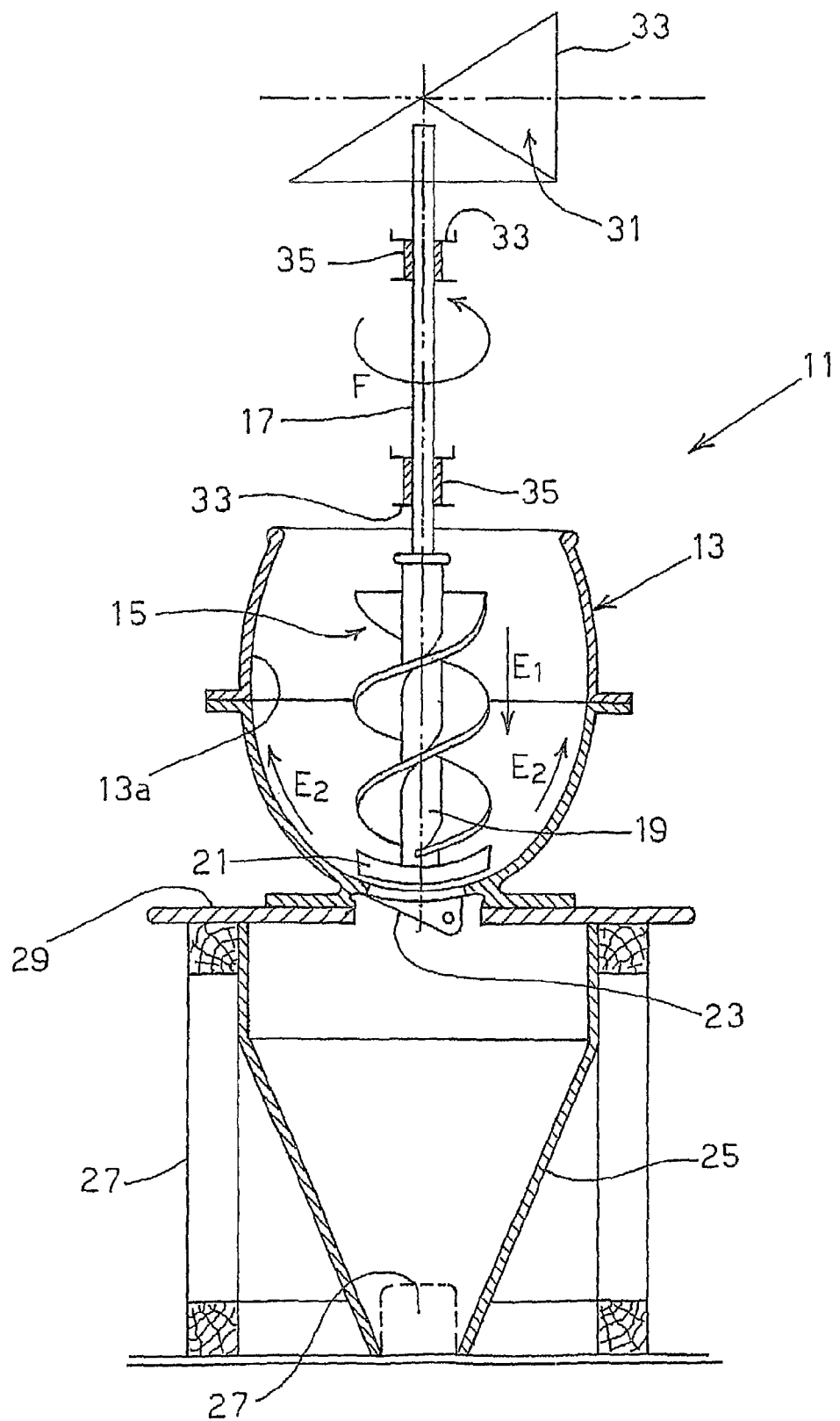
FIG. 4 is a schematic cross-sectional side view of a mixer used in the method according to the invention.

Referring to FIG. 4, there is schematically shown a mixer used for enriching rice grains with the method according to the invention.

The mixer, generally shown at 11, includes a container 13 where a mixing member 15 rotates.

According to the invention, container 13 and mixing member 15 are so arranged that they cooperate in order to give to the rice grain mixture a downward movement along the axis of the mixing member and an upward movement along the container walls. To this end, container 13 preferably has a circular cross-sectional shape with concave walls.

Mixing member 15 comprises a drive shaft 17 having associated thereto an Archimedean screw 19 and a distributing member 21 with radial blades. Rotation of drive shaft 17, in counter-clockwise direction in the illustrated exemplary embodiment, in the direction indicated by arrow F, gives a downward push along screw 19 to the rice grain and germ mixture contained in container 13 (arrow E1). The downwards stream of grains and germs, when reaching distributing member 21 and the bottom of container 13, is radially distributed against the walls of container 13 and hence moves upwards (arrow E2) along said walls 13a due to the effect of the downward push of new grains of the mixture.

Advantageously, according to the invention, walls 13a of container 13 are smooth, so as to reduce abrasive action onto rice grains and germs.

A door 23 is provided at the bottom of container 13 and is opened at the end of the mixing step to evacuate container 13.

A hopper 25 is provided below container 13, which is supported by a frame 27 having a horizontal plane 29 with a central hole for enabling opening of door 23.

Said hopper has a discharge opening 27 at its bottom for discharging the mixture of rice grains and germs so obtained from hopper 25.

In the illustrated exemplary embodiment, the mixing member defined by shaft 13 is equipped with an electrical motor-reducer 31 associated with a support structure schematically shown in the drawing and denoted by reference numeral 33. Moreover, rotatable bushes 35, associated with support structure 33, are arranged along drive shaft 17 to enable said shaft 17 to rotate about a vertical axis relative to support plane 29 of container 13.

In an exemplary embodiment of the method according to the invention a mixer of the kind described above was employed, where container 13 had a maximum diameter of about 0.80 m and a height of about 1 m, and the rotation speed of shaft 17 was about 190 rpm.

In the same exemplary embodiment, a mixture with a 2% content in rice germs was employed, and the above machine was operated for about 10 minutes.

Rice grains used in the mixture were rice grains resulting from the refining process, and therefore they were deprived of germs and substantially consisted in starch grains.

The product resulting from the mixing operation consisted in rice grains where the germs firmly adhered to the rice grains or at least part of them was incorporated into the grains, whereas the remaining part was pressed against the grain walls.

Advantageously, according to the invention, the product obtained substantially consisted only of rice grains incorporating the germs, and the amount of dispersed germs was negligible. In this way, thanks to the method according to the invention, a product with nutritive properties and cooking time very similar to those exhibited by rice before mixing with rice germs could be obtained.

More particularly, the product obtained can be used in food industry and in gastronomy, like the product before mixing, and it can be boiled and drained without substantial loss of the germ content.

The invention claimed is:

1. A method of making enriched rice, comprising the steps of:
    providing an amount of grains of refined rice, said grains of refined rice being reduced in germ so as to have a starch content of about 90% in weight, said grains of refined rice each having an outer wall;
    providing an amount of germs of rice in the range 1% to 10% in weight of the grains of refined rice together with the germs of rice; and
    causing said germs of rice to adhere to the outer wall of said grains of refined rice so as to form an integral body, through a mixing step of said grains of refined rice and said germs of rice, said mixing step being performed in an upright mixer comprising a container having internal smooth walls, so as to reduce abrasive action on said grains of refined rice and said germs of rice, internally equipped with a rotating mixing member comprising an endless helical screw and a distributing member, said container and said mixing member being so arranged that they cooperate in order to give to the mixture a downward movement along the axis of the mixing member and an upward movement along the container walls, said mixing step being performed for a time of 7 to 14 minutes with an increase in the temperature of the mixture up to about 30 to 40° C., and said mixing step being followed without interruption by a packing step, thereby avoiding the risk of separation of the germs of rice from the grains of refined rice because of abrasion or shaking of the enriched rice.

2. The method as claimed in claim 1, wherein said step of providing an amount of grains of refined rice comprises:
    providing an amount of rough rice;
    cleaning the rough rice;
    husking the rough rice to produce husked rice;
    whitening the husked rice by eliminating a thin film of aleurone (AL) coating the husked rice, from the husked rice itself.

3. The method as claimed in claim 1, wherein said amount of germs of rice is in the range 2% to 3% in weight of the mixture.

4. The method as claimed in claim 3, wherein said amount of germs of rice forms 2% in weight of the mixture.

5. The method as claimed in claim 1, wherein said mixing step takes place at a temperature of 35° C.

6. The method as claimed in claim 1, wherein said step of providing an amount of germs of rice comprises:
    providing an amount of rough rice;
    cleaning the rough rice;
    husking the rough rice;
    obtaining a mixture of chaff and germs of rice;
    separating the germs of rice from the chaff.

7. A rice mixture, characterized in that it is obtained by a method comprising the steps of:
    providing an amount of grains of refined rice, said grains of refined rice being reduced in germ so as to have a starch content of about 90% in weight, said grains of refined rice each having an outer wall;
    providing an amount of germs of rice in the range 1% to 10% in weight of the amount of the grains of refined rice together with the amount of the germs of rice; and
    causing said germs of rice to adhere to the outer wall of said grains of refined rice so as to form an integral body, through a mixing step of said grains of refined rice and said germs of rice to produce the rice mixture, said mixing step being performed in an upright mixer comprising a container having internal smooth walls, so as to reduce abrasive action on said grains of refined rice and said germs of rice, internally equipped with a rotating mixing member comprising an endless helical screw and a distributing member said container and said mixing member being so arranged that they cooperate in order to give to the mixture a downward movement along the axis of the mixing member and an upward movement along the container walls, said mixing step being performed for a time of 7 to 14 minutes with an increase in the temperature of the mixture up to about 30 to 40° C., and said mixing step being followed without interruption by a packing step, thereby avoiding the risk of separation of the germs of rice from the grains of refined rice because of abrasion or shaking of the rice mixture.

8. The mixture as claimed in claim 7, wherein the amount of the germs of rice is in the range of 2% to 3% in weight of the mixture.

9. The mixture as claimed in claim 8, wherein said amount of germs of rice forms 2% in weight of the mixture.

10. The method as claimed in claim 1, wherein said container has a circular cross-sectional shape with concave walls.

11. The method as claimed in claim 10, wherein said mixing member comprises a shaft, said container has a maximum diameter of about 0.80 m and a height of about 1 m, and the rotational speed of the shaft of the mixing member is about 190 rpm.

12. The method as claimed in claim 1, wherein said germs of rice are at least partially incorporated into said grains of refined rice.

* * * * *